United States Patent
Thomas et al.

(10) Patent No.: US 11,028,810 B2
(45) Date of Patent: Jun. 8, 2021

(54) INJECTOR METHOD OF SWITCHING BETWEEN INJECTION STATE AND DRAIN STATE

(71) Applicant: Cummins Inc., Columbus, IN (US)

(72) Inventors: Richard D. Thomas, North Vernon, IN (US); Lester L. Peters, Columbus, IN (US); Anthony A. Shaull, Columbus, IN (US)

(73) Assignee: Cummins, Inc., Columbus, IN (US)

(*) Notice: Subject to any disclaimer, the term of this patent is extended or adjusted under 35 U.S.C. 154(b) by 98 days.

(21) Appl. No.: 16/462,853

(22) PCT Filed: Nov. 22, 2017

(86) PCT No.: PCT/US2017/063052
§ 371 (c)(1),
(2) Date: May 21, 2019

(87) PCT Pub. No.: WO2018/098308
PCT Pub. Date: May 31, 2018

(65) Prior Publication Data
US 2020/0217286 A1 Jul. 9, 2020

Related U.S. Application Data

(60) Provisional application No. 62/425,281, filed on Nov. 22, 2016.

(51) Int. Cl.
*F02M 61/10* (2006.01)
*F02M 47/02* (2006.01)
(Continued)

(52) U.S. Cl.
CPC .......... *F02M 61/10* (2013.01); *F02M 47/027* (2013.01); *F02M 61/06* (2013.01);
(Continued)

(58) Field of Classification Search
CPC ...... F02M 61/10; F02M 47/027; F02M 61/06; F02M 61/08; F02M 63/0017; F02M 63/007; F02M 2200/46
(Continued)

(56) References Cited

U.S. PATENT DOCUMENTS 3,669,354 A 6/1972 Helyer
3,958,757 A * 5/1976 Happel .............. F02M 51/0675
239/125

(Continued)

OTHER PUBLICATIONS

International Search Report and Written Opinion issued by the ISA/US, Commissioner for Patents, dated Feb. 6, 2018, for International Application No. PCT/US2017/063052; 9 pages.
(Continued)

*Primary Examiner* — Steven J Ganey
(74) *Attorney, Agent, or Firm* — Faegre Drinker Biddle & Reath LLP (57) ABSTRACT

An injector is provided, comprising an injector body comprising an inlet passage configured to receive fluid, at least one injection outlet configured to deliver fluid, and a central bore, a needle valve disposed for reciprocal movement within the central bore between a closed position and an opened position; and an actuator configured to move the needle valve between the closed position wherein a first portion of a surface of the valve tip engages a first portion of a surface of the injector body to form a first seal that inhibits flow through the at least one injection outlet, and the opened position wherein a second portion of the surface of the valve tip engages a second portion of the surface of the injector body to form a second seal that inhibits flow through the drain outlet.

20 Claims, 10 Drawing Sheets

(51) Int. Cl.
  *F02M 61/06* (2006.01)
  *F02M 61/08* (2006.01)
  *F02M 63/00* (2006.01)
(52) U.S. Cl.
  CPC ........... *F02M 61/08* (2013.01); *F02M 63/007* (2013.01); *F02M 63/0017* (2013.01); *F02M 2200/46* (2013.01)
(58) Field of Classification Search
  USPC ........... 239/88, 124, 125, 126, 585.1, 585.4, 239/585.5, 533.12, 584
  See application file for complete search history.

(56) References Cited

U.S. PATENT DOCUMENTS

| | | | |
|---|---|---|---|
| 4,284,043 A | | 8/1981 | Happel |
| 4,875,658 A | * | 10/1989 | Asai ..................... H01F 7/1607 239/585.5 |
| 5,094,429 A | | 3/1992 | Dostert |
| 5,129,381 A | * | 7/1992 | Nakajima .......... F02M 51/0678 239/533.12 |
| 6,113,011 A | | 9/2000 | Potz et al. |
| 6,568,368 B1 | * | 5/2003 | Boecking ............. F02M 47/027 239/585.5 |
| 6,712,296 B1 | | 3/2004 | Hlousek et al. |
| 2002/0079388 A1 | | 6/2002 | Tian et al. |
| 2004/0065751 A1 | | 4/2004 | Boehland et al. |
| 2005/0087626 A1 | | 4/2005 | Sayar |
| 2006/0231647 A1 | | 10/2006 | Hohl et al. |

OTHER PUBLICATIONS

International Preliminary Report on Patentability received for PCT Patent Application No. PCT/US2017/063052, dated Nov. 5, 2018, 19 pages.

* cited by examiner

FIG. 10

# INJECTOR METHOD OF SWITCHING BETWEEN INJECTION STATE AND DRAIN STATE

CROSS-REFERENCE TO RELATED APPLICATIONS

This application is a U.S. national stage filing of PCT/US2017/063052, filed Nov. 22, 2017, which claims the benefit of U.S. Provisional Application Ser. No. 62/425,281 filed Nov. 22, 2016, the entire disclosures of which are each hereby expressly incorporated by reference herein in their entirety.

TECHNICAL FIELD

The present invention relates generally to injectors, and more particularly to methods and systems for switching injectors between an injection state and a drain state.

BACKGROUND

Injectors with drain circuits are known. For a variety of reasons, increasing the efficiency of such injectors is desirable, and one way of increasing efficiency is by downsizing the fluid system, thereby reducing the total cost of operating the system. It is desirable to provide an injector system that reduces the total flow requirements of the supply system while maintaining a drain circuit when injections are not provided. As such, providing an injector configuration that permits sizing of the supply system similar to that of a zero drain system while still providing the drain system, including its benefits of improved transient response, improved spray quality and improved injector cooling, is desirable.

SUMMARY

According to one embodiment, the present disclosure provides an injector, comprising: an injector body comprising an inlet passage configured to receive fluid, at least one injection outlet configured to deliver fluid, and a central bore, a needle valve disposed for reciprocal movement within the central bore between a closed position and an opened position, the needle valve comprising an armature, a valve tip and an elongated body between the armature and the valve tip, and an actuator configured to move the needle valve between the closed position wherein a first portion of a surface of the valve tip engages a first portion of a surface of the injector body to form a first seal that inhibits flow through the at least one injection outlet, and the opened position wherein a second portion of the surface of the valve tip engages a second portion of the surface of the injector body to form a second seal that inhibits flow through the drain outlet.

In one aspect of the injector, the first portion of the surface of the injector body and the second portion of the surface of the injector body are formed on a single integral piece.

In another aspect of the injector, the injector body further includes a delivery head, the delivery head defining the at least one injection outlet.

In a further aspect of the injector, the first portion of the surface of the injector body is formed on an upper surface of a lower seat of the delivery head.

In another aspect of the injector, the injector body further includes a flow control plate positioned longitudinally above the lower seat of the delivery head.

In a further aspect of the injector, the second portion of the surface of the injector body is formed along a lower surface of the flow control plate.

In another aspect of the injector, the flow control plate includes an intermediate passage in fluid communication with an inlet chamber positioned between the delivery head and the injector body and the at least one injection outlet.

In a further aspect of the injector, the injector further includes an inlet chamber, the inlet chamber being positioned between the flow control plate and the injector body, and an outlet chamber, the outlet chamber being positioned between the flow control plate and the delivery head.

In another aspect of the injector, a top of the inlet chamber is longitudinally below a bottom of the inlet passage.

In a further aspect of the injector, a bottom of the outlet chamber is longitudinally below a bottom of the inlet passage.

In another aspect of the injector, the injector further includes a spring positioned between the actuator and the armature to bias the needle valve toward the closed position.

In a further aspect of the injector, the actuator is mounted to the injector body via a clamp.

In another embodiment, the present disclosure provides an injector, comprising: an injector body comprising an inlet passage configured to receive fluid, a drain outlet, at least one injection outlet configured to deliver fluid, and a central bore; a needle valve disposed for reciprocal movement within the central bore between a closed position and an opened position, the needle valve comprising a plunger head, a valve tip and an elongated body between the plunger head and the valve tip; and an actuator configured to move the needle valve between the closed position wherein an angled upper surface of the valve tip engages an angled lower surface of the injector body to form a first seal that inhibits flow through the at least one injection outlet, and the opened position wherein an angled lower surface of the plunger head engages an angled upper surface of the injector body to form a second seal that inhibits flow through the drain outlet.

In yet another embodiment, the present disclosure provides an injector, comprising: an injector body comprising an inlet passage configured to receive fluid, a drain outlet, at least one injection outlet configured to deliver fluid, and a central bore, a needle valve disposed for reciprocal movement within the central bore between a closed position and an opened position, the needle valve comprising a plunger head, a valve tip and an elongated body between the plunger head and the valve tip, and an actuator mounted to the injector body, the actuator being configured to move the needle valve between the closed position wherein an angled upper surface of the valve tip engages an angled lower surface of the injector body to form a first seal that inhibits flow through the at least one injection outlet, and the opened position wherein an angled lower surface of the plunger head engages an angled upper surface of the injector body to form a second seal that inhibits flow through the drain outlet.

In one aspect of the injector, the injector body further includes a delivery head.

In another aspect of the injector, the at least one injection outlet is formed between the delivery head and at least one of the valve tip and the injector body.

In a further aspect of the injector, the needle valve further includes an enlarged portion between the plunger head and the valve tip.

In another aspect of the injector, the injector further includes a spring positioned between the enlarged portion and the valve tip to bias the needle valve toward the closed position.

In still another embodiment, the present disclosure provides an injector, comprising: an injector body comprising an inlet passage configured to receive fluid, a drain outlet, at least one injection outlet configured to deliver fluid, and a central bore; a needle valve disposed for reciprocal movement within the central bore between a closed position and an opened position, the needle valve comprising a piston, a valve tip and an elongated body between the piston and the valve tip; and an actuator mounted to the injector body, the actuator being configured to move the needle valve between the closed position wherein an angled lower surface of the valve tip engages an angled upper surface of the injector body to form a first seal that inhibits flow through the at least one injection outlet, and the opened position wherein an angled upper surface of the piston engages an angled lower surface of the injector body to form a second seal that inhibits flow through the drain outlet.

In one aspect of the injector, the injector further includes a spring positioned between the piston and the injector body to bias the needle valve toward the opened position.

In another aspect of the injector, the spring is positioned longitudinally above the piston.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1:
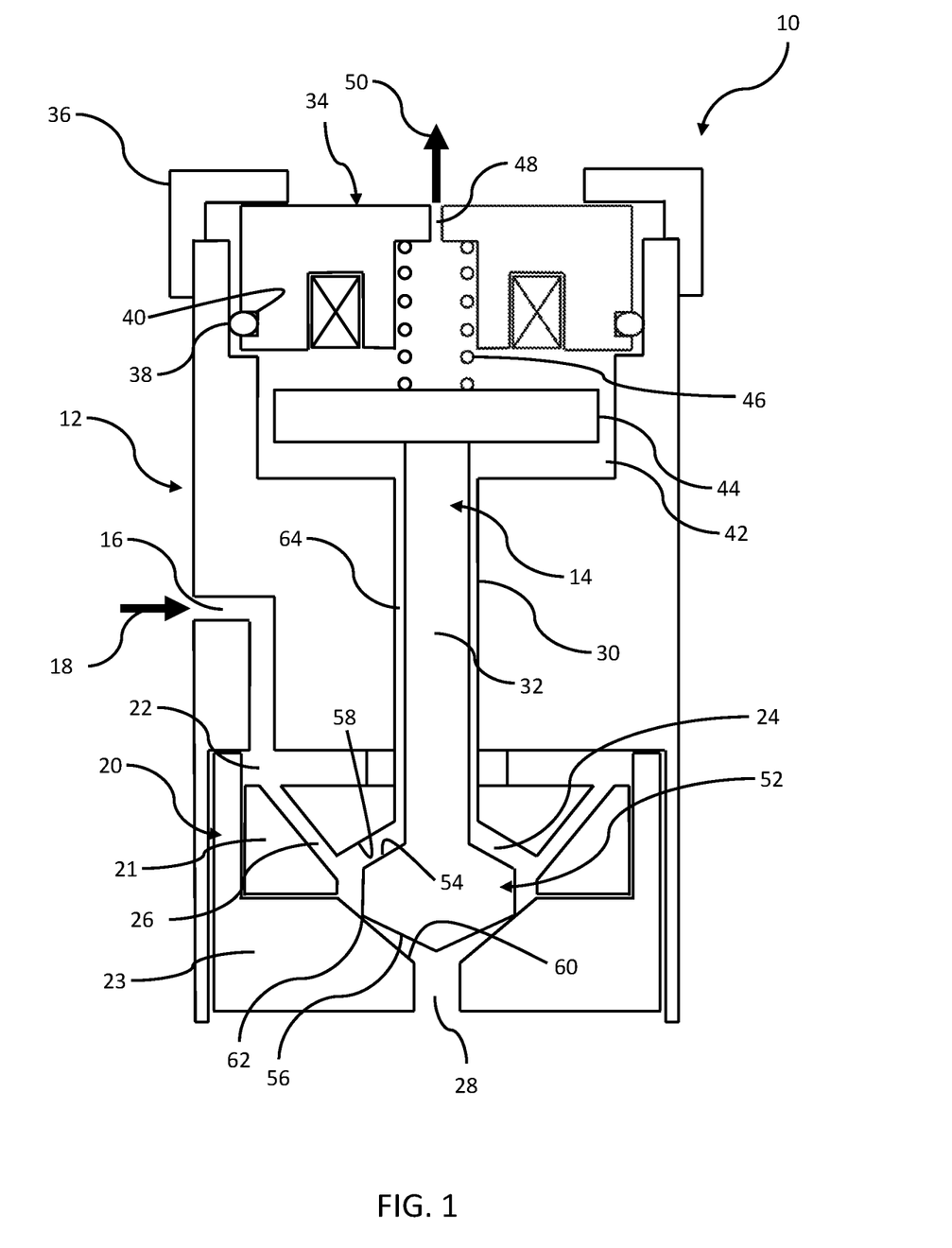
FIG. 1 is a partially sectional side view of a first embodiment of an injector according to the present disclosure in a closed position.

Referring now to FIG. 1, an injector according to one embodiment of the present disclosure is shown. It should be understood that throughout this description, the embodiments of injectors are referred to as fuel injectors as an example only. The injectors described herein may be used to deliver a variety of fluids including fuel, water and urea (as a urea doser), among others. The description is not intended to be limited to fuel injectors. Fuel injector 10 generally includes a fuel injector body 12 and a needle valve 14. Injector body 12 includes an inlet passage 16 into which fuel (arrow 18) is provided by a fuel supply system (not shown), a delivery head 20 that defines an inlet chamber 22 in fluid communication with inlet passage 16, an outlet chamber 24 in fluid communication with inlet chamber 22 via intermediate passages 26 (configured to provide a desired fuel swirl—only two shown), and at least one injection outlet 28 in fluid communication with outlet chamber 24. In various embodiments, a top of inlet chamber 22 may be longitudinally below a bottom of inlet passage 16, and/or a bottom of outlet chamber 24 may be longitudinally below a bottom of inlet passage 16. Delivery head 20 includes a flow control plate 21 that partially defines intermediate passages 26 and a lower seat 23 that partially defines outlet chamber 24. Injector body 12 further includes a central bore 30 through which an elongated body 32 of needle valve 14 extends for reciprocal movement as described below. In this example embodiment, a solenoid assembly or electro-magnetic actuator 34 is coupled to injector body 12 by a clamp 36, and a seal between injector body 12 and actuator 34 is formed by an O-ring 38 disposed within an annular groove 40 formed in actuator 34. Actuator 34 and injector body 12 together form a drain chamber 42 in which an armature 44 of needle valve 14 reciprocates under the influence of actuator 34 and return spring 46 as is known by those skilled in the art. Actuator 34 also includes a drain outlet 48 in fluid communication with drain chamber 42 through which fuel (arrow 50) is drained in the manner described below.

As shown in FIG. 1, needle valve 14 includes a valve tip 52 disposed in outlet chamber 24. In various embodiments, valve tip 52 may be a rounded tip or a polygonal tip such as a ball tip (FIGS. 9 and 10), a hexagonal tip (FIGS. 1-4), a pentagonal tip (FIGS. 5 and 6), or a diamond or pointed tip (FIGS. 7 and 8), for example. Valve tip 52 includes an angled upper surface 54 and an angled lower surface 56. Outlet chamber 24 includes an angled lower surface 58 configured to mate with angled upper surface 54 of valve tip 52 and an angled upper surface 60 configured to mate with angled lower surface 56 of valve tip 52. When actuator 34 (which may be controlled by an ECM or other controller (not shown) in a manner known by those skilled in the art) is deactivated, return spring 46 acts on armature 44 to move needle valve 14 to its closed position as shown in FIG. 1 (placing injector 10 in a drain state). When needle valve 14 is in the closed position, angled lower surface 56 of valve tip 52 contacts angled upper surface 60 of outlet chamber 24 to form a seal 62 that inhibits the flow of fuel from outlet chamber 24 through injection outlet 28. Consequently, fuel flows through inlet passage 16, into inlet chamber 22, through intermediate passages 26, into outlet chamber 24, through central bore 30 (in an annular gap 64 formed between elongated body 32 and central bore 30), into drain chamber 42, and out of fuel injector 10 through drain outlet 48.

Figure 2:
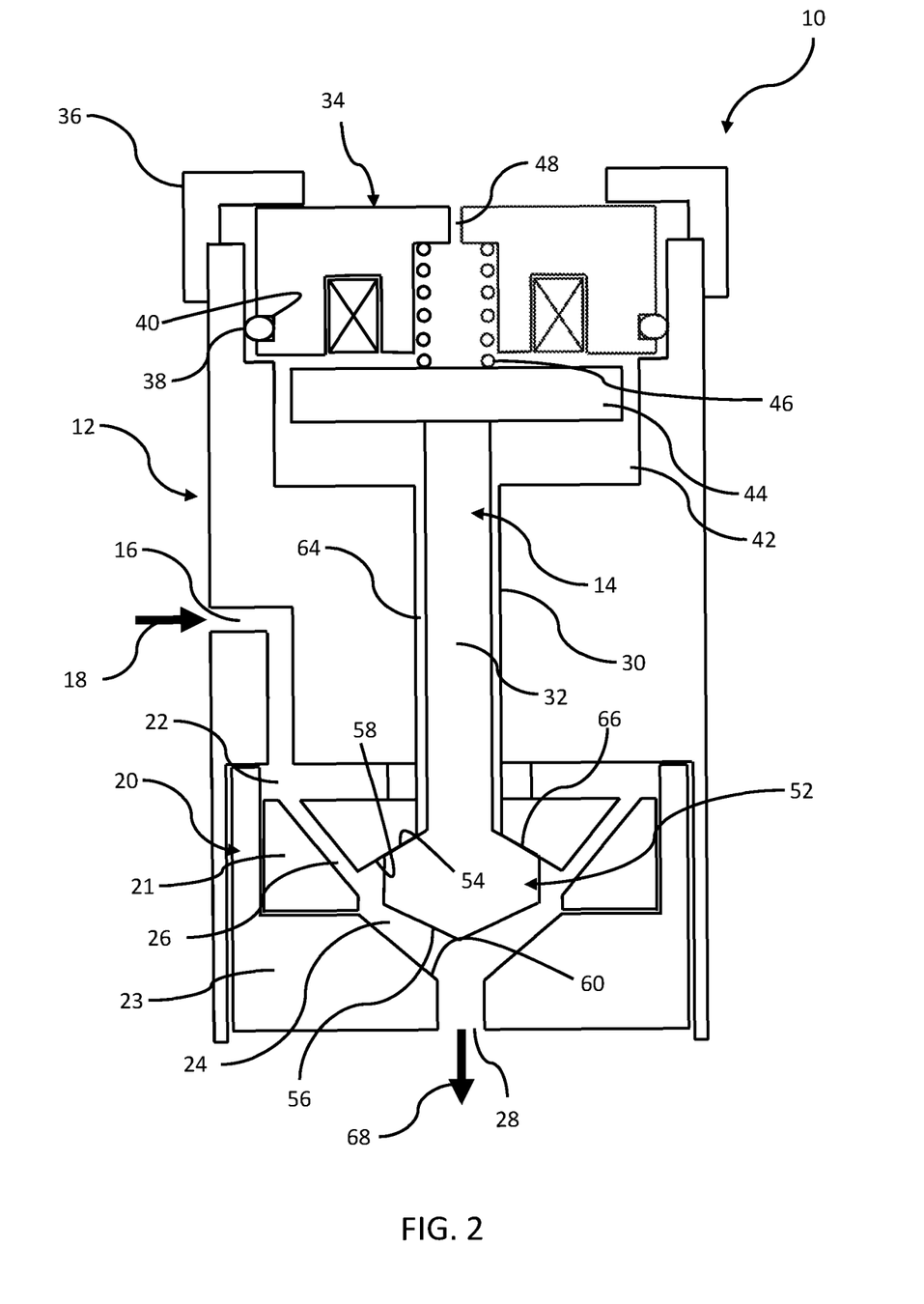
FIG. 2 is a partially sectional side view of the injector of FIG. 1 in the opened position.

FIG. 2 shows needle valve 14 in its opened position. Needle valve 14 is moved to the opened position by activating actuator 34 to draw armature 44 of needle valve 14 upwardly against the biasing force of return spring 46 (placing injector 10 in an injection state). When needle valve 14 is drawn upwardly, angled upper surface 54 of valve tip 52 is moved into engagement with angled lower surface 58 of outlet chamber 24 to form a seal 66 which inhibits flow from outlet chamber 24 to central bore 30 (i.e., inhibits flow to drain outlet 48). Instead, fuel from inlet passage 16 flows through inlet chamber 22, intermediate passages 26, and outlet chamber 24, and out of fuel injector 10 through injection outlet 28 (as indicated by arrow 68). Thus, as should be apparent from the foregoing, when needle valve 14 is in the closed position (FIG. 1), seal 62 permits fuel to flow out drain outlet 48, but inhibits fuel from flowing out injection outlet 28. Conversely, when needle valve 14 is in the opened position, seal 66 permits fuel to flow out injection outlet 28, but inhibits fuel from flowing out drain outlet 48.

Figure 3:
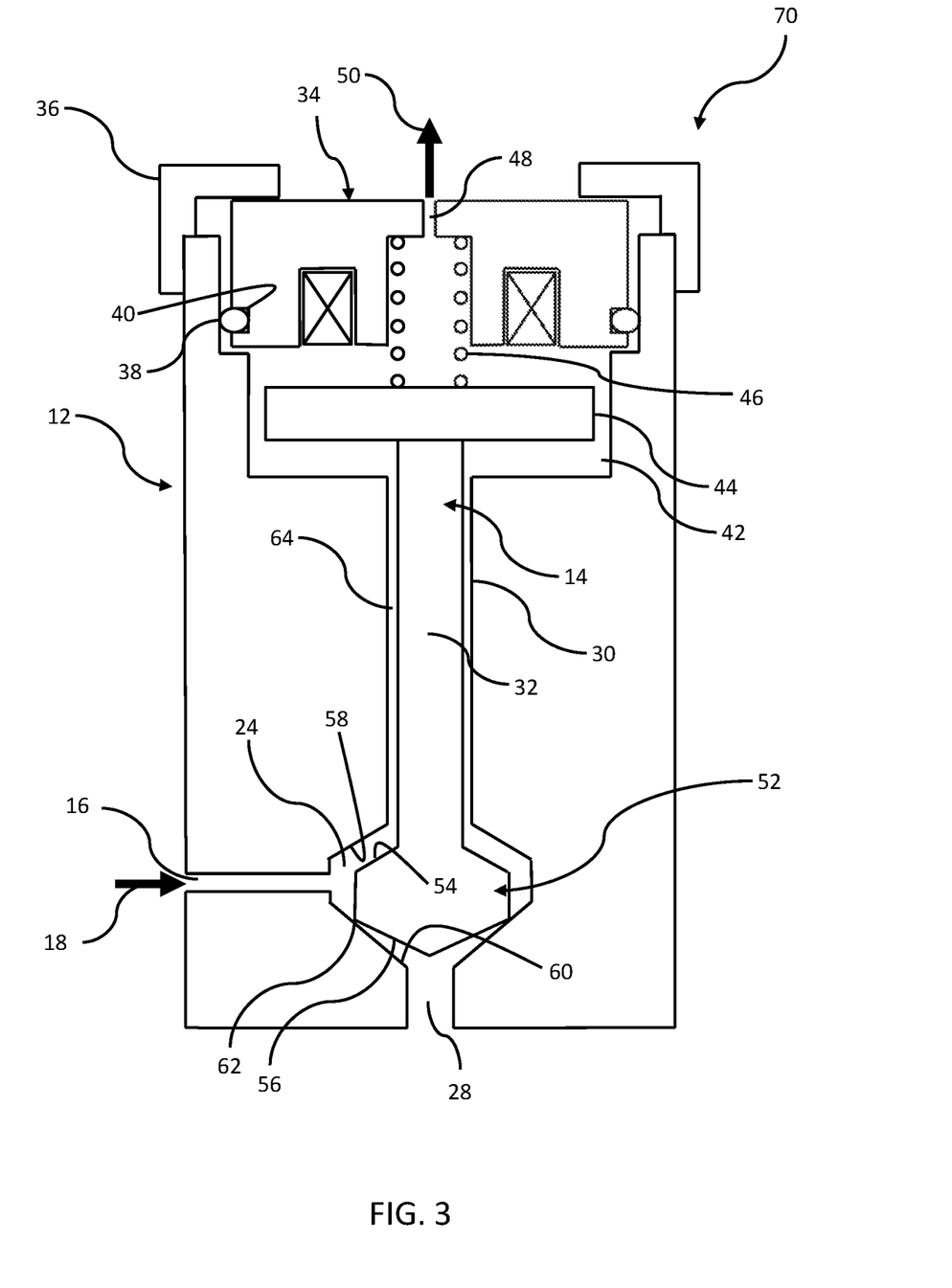
FIG. 3 is a partially sectional side view of a second embodiment of an injector according to the present disclosure in a closed position.
Figure 4:
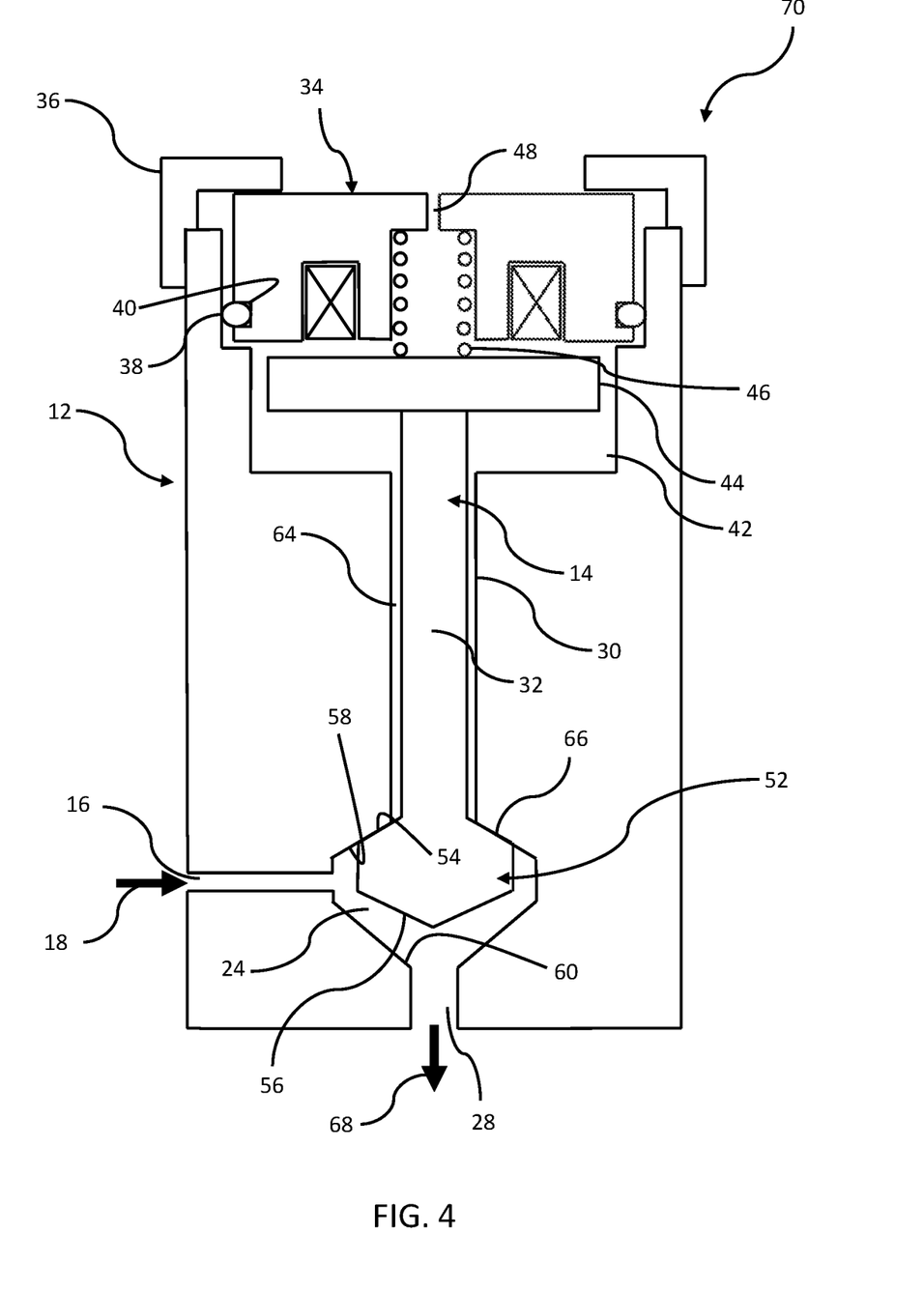
FIG. 4 is a partially sectional side view of the injector of FIG. 3 in the opened position.

Another embodiment of a fuel injector according to the principles of the present disclosure is shown in FIGS. 3 and 4. In the description of fuel injector 70 of FIGS. 3 and 4, components that are the same as those of previously described fuel injectors retain their same reference numbers. In the embodiment represented by fuel injector 70, inlet chamber 22 and intermediate passages 26 of fuel injector 10 have been omitted, as have passages 26 configured to cause swirl in the delivered fuel, and inlet passage 16 is in direct fluid communication with outlet chamber 24. When needle valve 14 of fuel injector 70 is in its closed position as shown in FIG. 3 (i.e., injector 70 is in the drain state), angled lower surface 56 of valve tip 52 engages angled upper surface 60 of outlet chamber 24 to form seal 62. Consequently, fuel flows through inlet passage 16, annular gap 64, drain chamber 42, and out drain outlet 48 as indicated by arrow 50. Fuel is inhibited by seal 62 from flowing out injection outlet 28.

Referring now to FIG. 4, needle valve 14 is shown in its opened position (i.e., injector 70 is in the injection state). When needle valve 14 is in its opened position, angled upper surface 54 of valve tip 52 engages angled lower surface 58 of outlet chamber 24 to form seal 66. Consequently, fuel flows though inlet passage 16 and outlet chamber 24, and is delivered through injection outlet 28 (see arrow 68). Fuel is inhibited by seal 66 from flowing out drain outlet 48.

Figure 5:
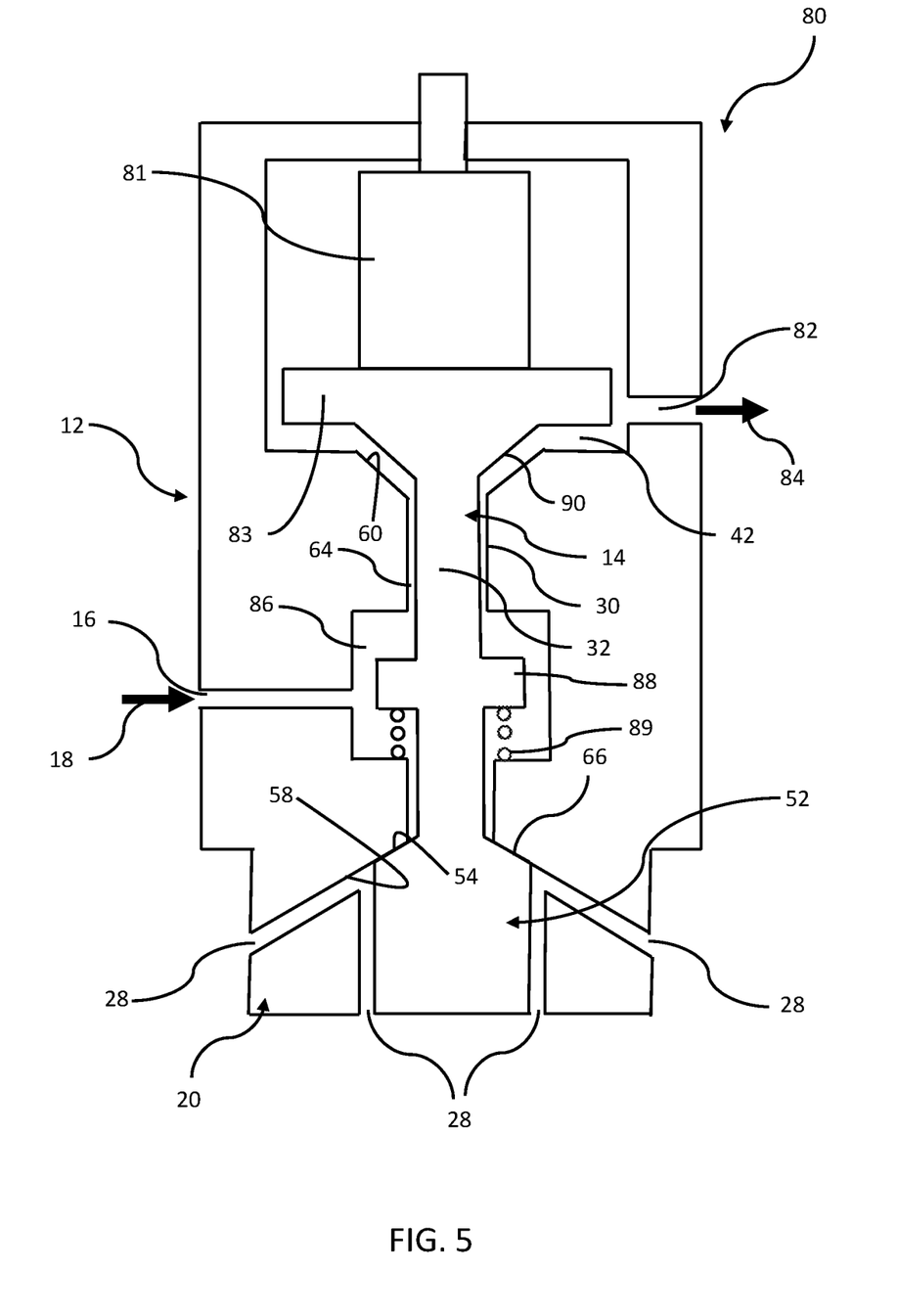
FIG. 5 is a partially sectional side view of a third embodiment of an injector according to the present disclosure in a closed position.
Figure 6:
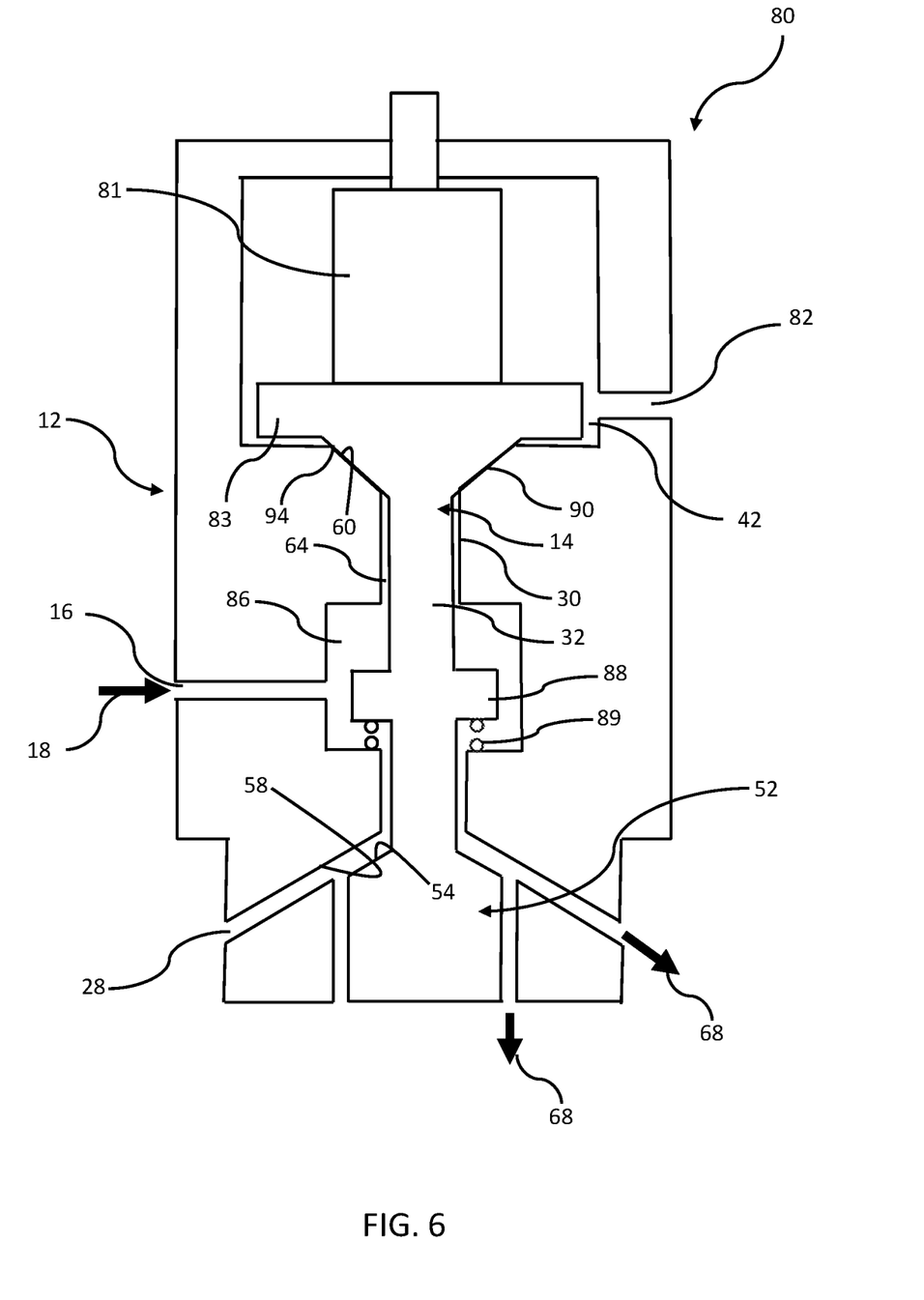
FIG. 6 is a partially sectional side view of the injector of FIG. 5 in the opened position.

Yet another embodiment of a fuel injector according to the principles of the present disclosure is shown in FIGS. 5 and 6. In the description of fuel injector 80 of FIGS. 5 and 6, components that are the same as those of previously described fuel injectors retain their same reference numbers. In the embodiment represented by fuel injector 80, injector body 12 includes a drain outlet 82 for delivery of drain fuel (arrow 84) and an intermediate chamber 86 in fluid communication with inlet passage 16. Injector body 12 may also include a delivery head 20 that defines a plurality of injection outlets 28. When injector body 12 does not include delivery head 20, injection outlets 68 extend between valve tip 52 and injector body 12. When injector body 12 does include delivery head 20, injection outlets extend between valve tip 52, delivery head 20, and injector body 12. Injector body 12 further includes angled upper surface 60 in drain chamber 42 and angled lower surface 58 adjacent delivery head 20. Fuel injector 80 further includes an actuator or piezo-electric element 81 which expands in length (along its longitudinal axis) when energized. Needle valve 14 includes a modified elongated body 32 with an enlarged portion 88 disposed within intermediate chamber 86 and a plunger head 83 which is movable by element 81. Enlarged portion 88 is configured as a shoulder for engaging spring 89. Plunger head 83 includes an angled lower surface 90 configured to engage an angled upper surface 60 of injector body 12.

When piezo-electric element 81 is de-energized, it and the upward biasing force of spring 89 moves plunger head 83 (and therefore, needle valve 14) upwardly as viewed in the figures, placing needle valve 14 in the closed position (i.e., injector 80 is in the drain state). When needle valve 14 of fuel injector 80 is in its closed position as shown in FIG. 5, angled upper surface 54 of valve tip 52 engages angled lower surface 58 of injector body 12 to form seal 66. Consequently, fuel flows through inlet passage 16, intermediate chamber 86, annular gap 64, and drain chamber 42, and out drain outlet 82 as indicated by arrow 84. Fuel is inhibited by seal 66 from flowing out injection outlets 28.

Referring now to FIG. 6, when element 81 is energized, it urges plunger head 83 (and therefore, needle valve 14) downwardly against the biasing force of spring 89 as viewed in the figures, placing needle valve 14 in the opened position (i.e., injector 80 is in the injection state). When needle valve 14 is in its opened position, angled lower surface 90 of plunger head 83 engages angled upper surface 60 of injector body 12 to form seal 94. Consequently, fuel flows though inlet passage 16 and intermediate chamber 86, and is delivered through injection outlets 28 (see arrows 68). Fuel is inhibited by seal 94 from flowing out drain outlet 82.

Figure 7:
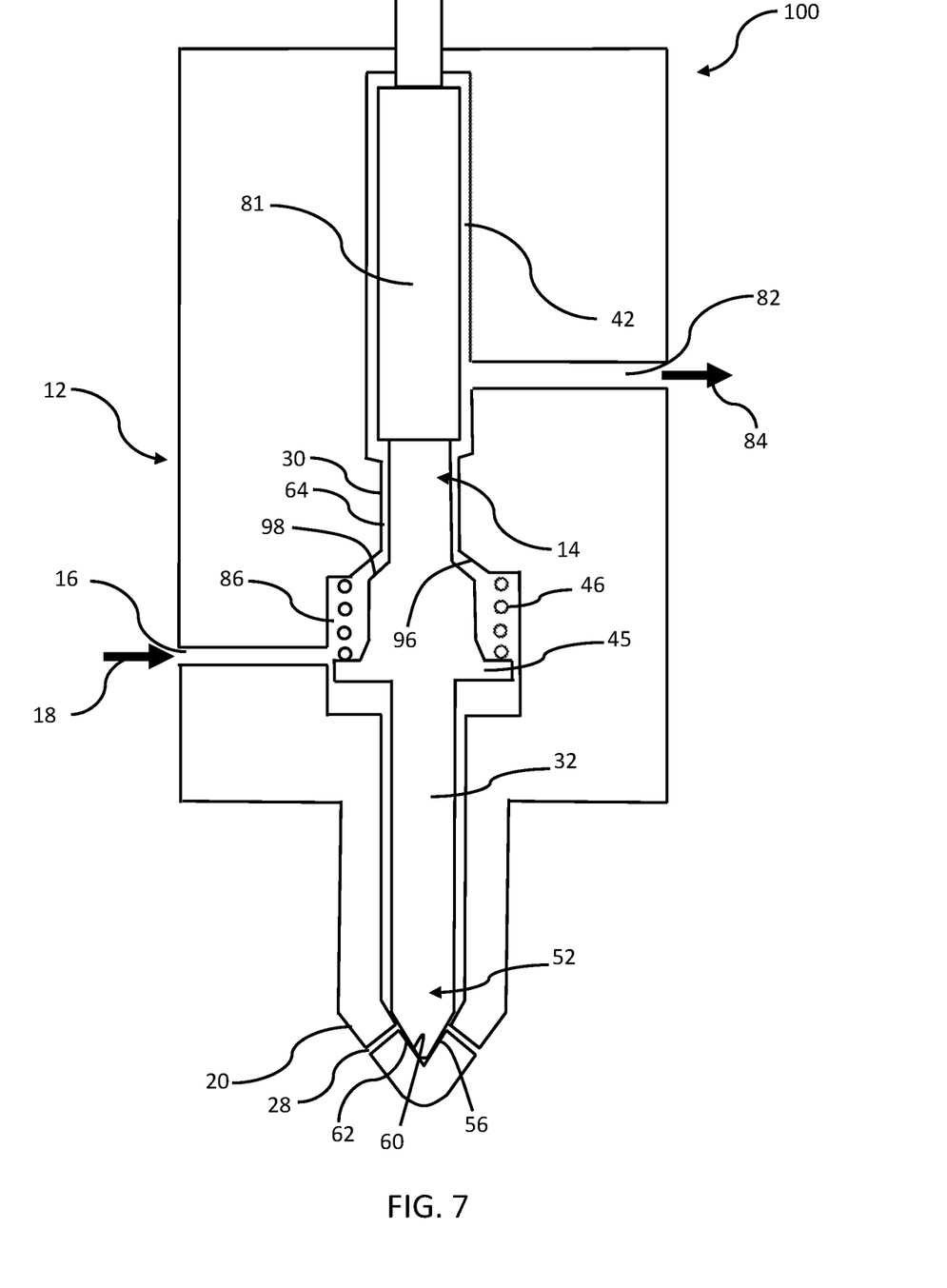
FIG. 7 is a partially sectional side view of a fourth embodiment of an injector according to the present disclosure in a closed position.
Figure 8:
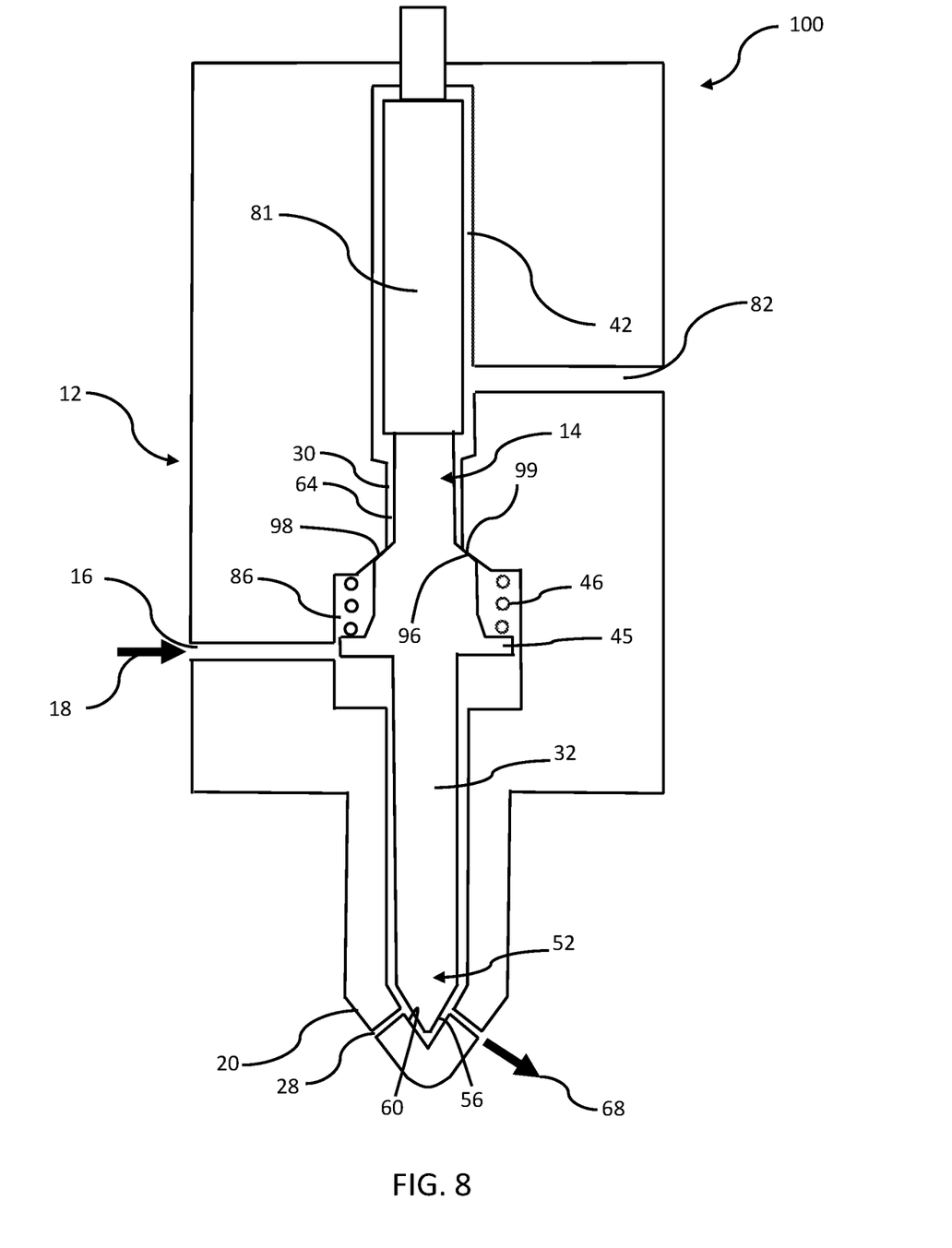
FIG. 8 is a partially sectional side view of the injector of FIG. 7 in the opened position.

Another embodiment of a fuel injector according to the principles of the present disclosure is shown in FIGS. 7 and 8. In the description of fuel injector 100 of FIGS. 7 and 8, components that are the same as those of previously described fuel injectors retain their same reference numbers. In the embodiment represented by fuel injector 100, intermediate chamber 86 of injector body 12 contains piston 45 and return spring 46, which in this example is normally compressed to draw piston upwardly as viewed in the figures. It should be understood that return spring 46 may be normally expanded to cooperate with the actuation mechanism 81 used to move piston 45. Intermediate chamber 86 further includes angled lower surface 96. Piston 45 includes angled upper surface 98.

When piezo-electric element 81 is energized and needle valve 14 of fuel injector 100 is in its closed position as shown in FIG. 7 (i.e., injector 100 is in the drain state), spring 46 is expanded and angled lower surface 56 of valve tip 52 engages angled upper surface 60 of delivery head 20 to form seal 62. Consequently, fuel flows through inlet passage 16, intermediate chamber 86, and annular gap 64, and out drain outlet 82 as indicated by arrow 84. Fuel is inhibited by seal 62 from flowing out injection outlets 28.

Referring now to FIG. 8, when piezo-electric element 81 is de-energized and needle valve 14 is in its opened position (i.e., injector 100 is in the injection state), spring 46 draws piston 45 upwardly and angled upper surface 98 of piston 45 engages angled lower surface 96 of intermediate chamber 86 to form seal 99. Consequently, fuel flows though inlet passage 16 and intermediate chamber 86, and is delivered through injection outlets 28 (see arrow 68). Fuel is inhibited by seal 99 from flowing out drain outlet 82.

Figure 9:
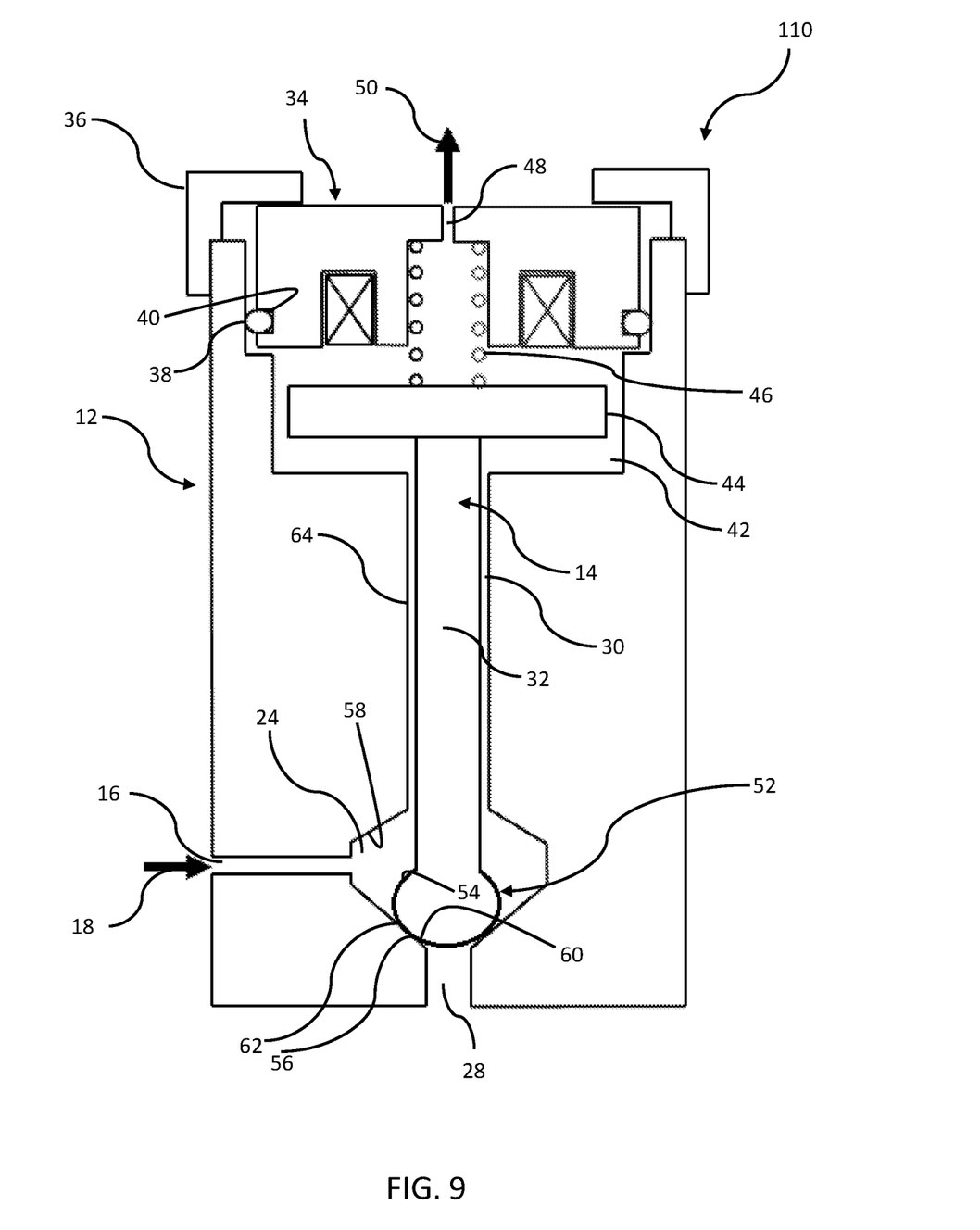
FIG. 9 is a partially sectional side view of a fifth embodiment of an injector according to the present disclosure in a closed position.
Figure 10:
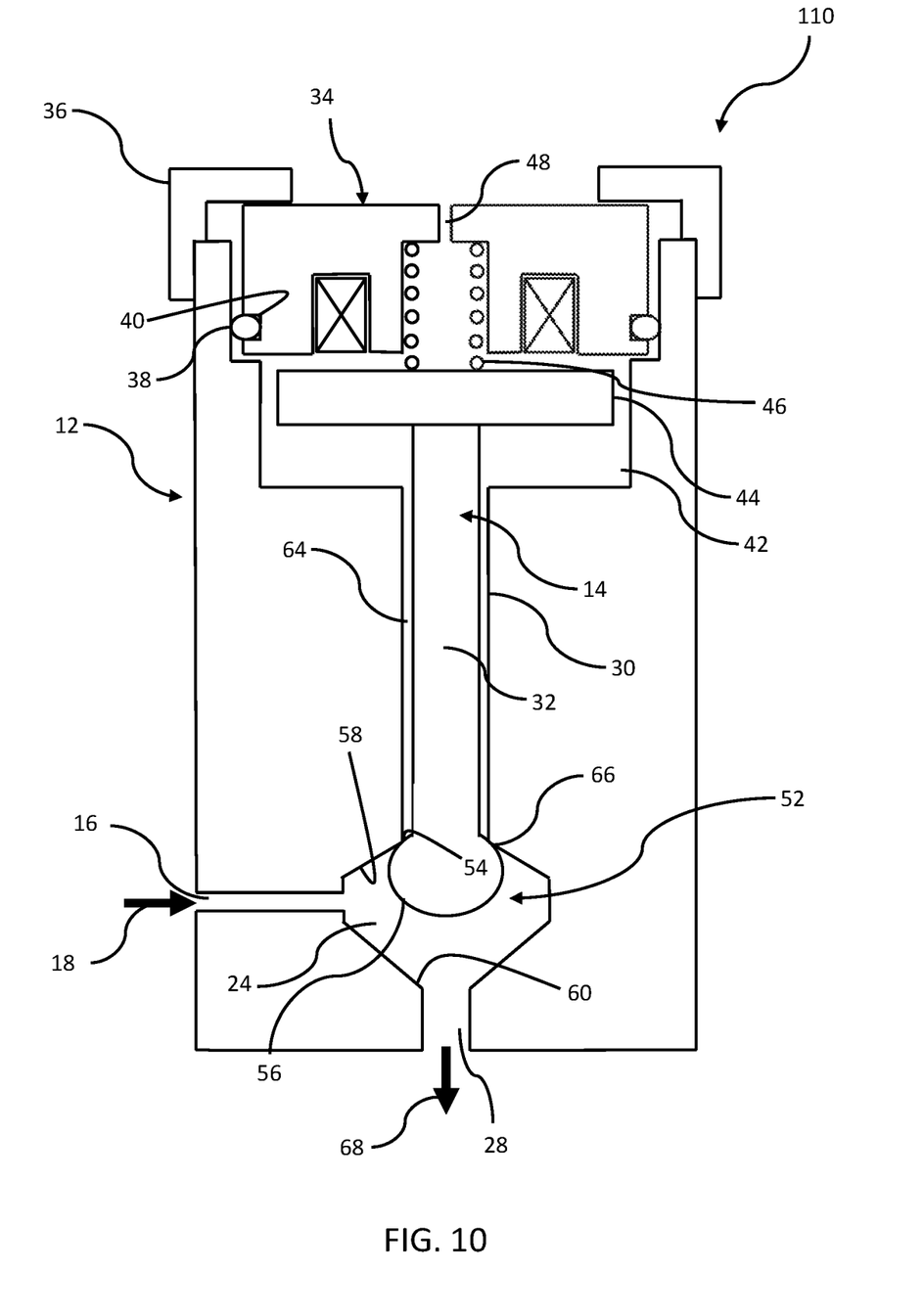
FIG. 10 is a partially sectional side view of the injector of FIG. 9 in the opened position.

Yet another embodiment of a fuel injector according to the principles of the present disclosure is shown in FIGS. 9 and 10. In the description of fuel injector 110 of FIGS. 9 and 10, components that are the same as those of previously described fuel injectors retain their same reference numbers. In the embodiment represented by fuel injector 110, inlet chamber 22 and intermediate passages 26 of fuel injector 10 have been omitted, as have passages 26 configured to cause swirl in the delivered fuel, and inlet passage 16 is in direct fluid communication with outlet chamber 24. When needle valve 14 of fuel injector 110 is in its closed position as shown in FIG. 9 (i.e., injector 110 is in the drain state), lower surface 56 of valve tip 52 engages angled upper surface 60 of outlet chamber 24 to form seal 62. Consequently, fuel flows through inlet passage 16, annular gap 64, drain chamber 42, and out drain outlet 48 as indicated by arrow 50. Fuel is inhibited by seal 62 from flowing out injection outlet 28.

Referring now to FIG. 10, needle valve 14 is shown in its opened position (i.e., injector 110 is in the injection state). When needle valve 14 is in its opened position, upper surface 54 of valve tip 52 engages angled lower surface 58 of outlet chamber 24 to form seal 66. Consequently, fuel flows though inlet passage 16 and outlet chamber 24, and is delivered through injection outlet 28 (see arrow 68). Fuel is inhibited by seal 66 from flowing out drain outlet 48.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. An injector, comprising:
an injector body comprising an inlet passage configured to receive fluid from an inlet port at the injector body, at least one injection outlet configured to deliver fluid, and a central bore;
a needle valve disposed for reciprocal movement within the central bore between a closed position and an opened position, the needle valve comprising an armature, a valve tip and an elongated body between the armature and the valve tip; and
an actuator configured to move the needle valve between the closed position wherein a first portion of a surface of the valve tip engages a first portion of a surface of the injector body to form a first seal that inhibits flow through the at least one injection outlet, and the opened position wherein a second portion of the surface of the valve tip engages a second portion of the surface of the injector body to form a second seal that inhibits flow through a drain outlet, and the inlet port is positioned longitudinally intermediate the drain outlet and the at least one injection outlet.

2. The injector of claim 1, wherein the first portion of the surface of the injector body and the second portion of the surface of the injector body are formed on a single integral piece.

3. The injector of claim 1, wherein the injector body further includes a delivery head, the delivery head defining the at least one injection outlet.

4. The injector of claim 3, wherein the first portion of the surface of the injector body is formed on an upper surface of a lower seat of the delivery head.

5. The injector of claim 4, wherein the injector body further includes a flow control plate positioned longitudinally above the lower seat of the delivery head.

6. The injector of claim 5, wherein the second portion of the surface of the injector body is formed along a lower surface of the flow control plate.

7. The injector of claim 5, wherein the flow control plate includes an intermediate passage in fluid communication with an inlet chamber positioned between the delivery head and the injector body and the at least one injection outlet.

8. The injector of claim 7 further including an inlet chamber, the inlet chamber being positioned between the flow control plate and the injector body, and an outlet chamber, the outlet chamber being positioned between the flow control plate and the delivery head.

9. The injector of claim 8, wherein a top of the inlet chamber is longitudinally below a bottom of the inlet passage.

10. The injector of claim 8, wherein a bottom of the outlet chamber is longitudinally below a bottom of the inlet passage.

11. The injector of claim 1 further including a spring positioned between the actuator and the armature to bias the needle valve toward the closed position.

12. The injector of claim 1, wherein the actuator is mounted to the injector body via a clamp.

13. An injector, comprising:
   an injector body comprising an inlet passage configured to receive fluid from an inlet port at the injector body, a drain outlet, at least one injection outlet configured to deliver fluid, and a central bore, and the inlet port is positioned longitudinally intermediate the drain outlet and the at least one injection outlet;
   a needle valve disposed for reciprocal movement within the central bore between a closed position and an opened position, the needle valve comprising a plunger head, a valve tip and an elongated body between the plunger head and the valve tip; and
   an actuator configured to move the needle valve between the closed position wherein an angled upper surface of the valve tip engages an angled lower surface of the injector body to form a first seal that inhibits flow through the at least one injection outlet, and the opened position wherein an angled lower surface of the plunger head engages an angled upper surface of the injector body to form a second seal that inhibits flow through the drain outlet.

14. The injector of claim 13, wherein the injector body further includes a delivery head.

15. The injector of claim 14, wherein the at least one injection outlet is formed between the delivery head and at least one of the valve tip and the injector body.

16. The injector of claim 13, wherein the needle valve further includes an enlarged portion between the plunger head and the valve tip.

17. The injector of claim 16 further including a spring positioned between the enlarged portion and the valve tip to bias the needle valve toward the closed position.

18. An injector, comprising:
   an injector body comprising an inlet passage configured to receive fluid from an inlet port at the injector body, a drain outlet, at least one injection outlet configured to deliver fluid, and a central bore, and the inlet port is positioned longitudinally intermediate the drain outlet and the at least one injection outlet;
   a needle valve disposed for reciprocal movement within the central bore between a closed position and an opened position, the needle valve comprising a piston, a valve tip and an elongated body between the piston and the valve tip; and
   an actuator mounted to the injector body, the actuator being configured to move the needle valve between the closed position wherein an angled lower surface of the valve tip engages an angled upper surface of the injector body to form a first seal that inhibits flow through the at least one injection outlet, and the opened position wherein an angled upper surface of the piston engages an angled lower surface of the injector body to form a second seal that inhibits flow through the drain outlet.

19. The injector of claim 18 further comprising a spring positioned between the piston and the injector body to bias the needle valve toward the opened position.

20. The injector of claim 19, wherein the spring is positioned longitudinally above the piston.

\* \* \* \* \*